United States Patent
Ho et al.

[19]

[11] Patent Number: 6,140,621
[45] Date of Patent: Oct. 31, 2000

[54] TOASTER OVEN WITH TIMER DISPLAY

[75] Inventors: Hoo-Yin Ho; Kwok-Fai Liu; Wing-Chung Li, all of Chai Wan, The Hong Kong Special Administrative Region of the People's Republic of China

[73] Assignee: Simatelex Manufactory Co., Ltd., The Hong Kong Special Administrative Region of the People's Republic of China

[21] Appl. No.: 09/305,164

[22] Filed: May 4, 1999

[51] Int. Cl.$^7$ ....................................................... H05B 1/02
[52] U.S. Cl. .......................... 219/494; 219/518; 219/492; 219/506; 99/329 R; 99/331
[58] Field of Search ....................................... 219/502, 492, 219/494, 518, 519, 506, 505, 497; 99/329 R, 329 RT, 331–333, 338

[56] References Cited

U.S. PATENT DOCUMENTS

| | | | |
|---|---|---|---|
| 4,168,421 | 9/1979 | Ito | 219/216 |
| 4,345,145 | 8/1982 | Norwood | 219/492 |
| 4,894,518 | 1/1990 | Ishikawa et al. | 219/413 |
| 5,128,521 | 7/1992 | Lanno et al. | 219/518 |
| 5,414,243 | 5/1995 | Snell et al. | 219/492 |
| 5,705,791 | 1/1998 | Sutton et al. | 219/492 |

*Primary Examiner*—Mark Paschall
*Attorney, Agent, or Firm*—Jackson Walker L.L.P.

[57] ABSTRACT

A toast oven is controlled by a microprocessor that is programmed to selectively determine each toasting time in accordance with a user selected toasting requirement and with an initial oven temperature. In this way the toasting time is automatically adjusted to take into account the oven temperature at the beginning of each toasting cycle. The user therefore does not have to make subjective manual adjustments to produce consistent toasting results. A time display on a panel, controlled by the microprocessor, indicates the remaining toasting time during each toasting cycle.

4 Claims, 7 Drawing Sheets

TOASTER OVEN WITH TIMER DISPLAY

BACKGROUND OF THE INVENTION

1. Field of the Invention

The invention relates to toast ovens.

2. Description of Prior Art

Toast ovens are domestic appliances that are used to bake meat and other food stuffs and are capable of toasting slices of bread loaves, buns and the like. Generally stated, control of cooking is more critical for toasting and, thus far, such control is dependent on bimetallic temperature sensitive switches and relies upon regular manual adjustments of timing periods for consistent toasting performance.

SUMMARY OF THE INVENTION

It is an object of the invention to provide better cooking control especially for toasting.

According to the invention there is provided a toast oven having a radiant electrical heater mounted in an oven chamber, a thermistor arranged to produce electrical signals corresponding to temperature in the chamber, a microcomputer programmed to selectively determine each toasting time for food stuff in the chamber in accordance with a user selected toasting requirement and with an initial oven temperature derived from said electrical signals.

The toast oven preferably includes a toasting time display means that is controlled by the microcomputer to indicate and provide the remaining toasting time during each toasting cycle.

The heaters are preferably arranged to be supplied in use with a pulse width modulated direct current power supply under the control of the microcomputer.

BRIEF DESCRIPTION OF THE DRAWING

A toast oven according to the invention will now be described by way of example with reference to the accompanying drawings in which.

DESCRIPTION OF THE PREFERRED EMBODIMENTS

Figure 1:
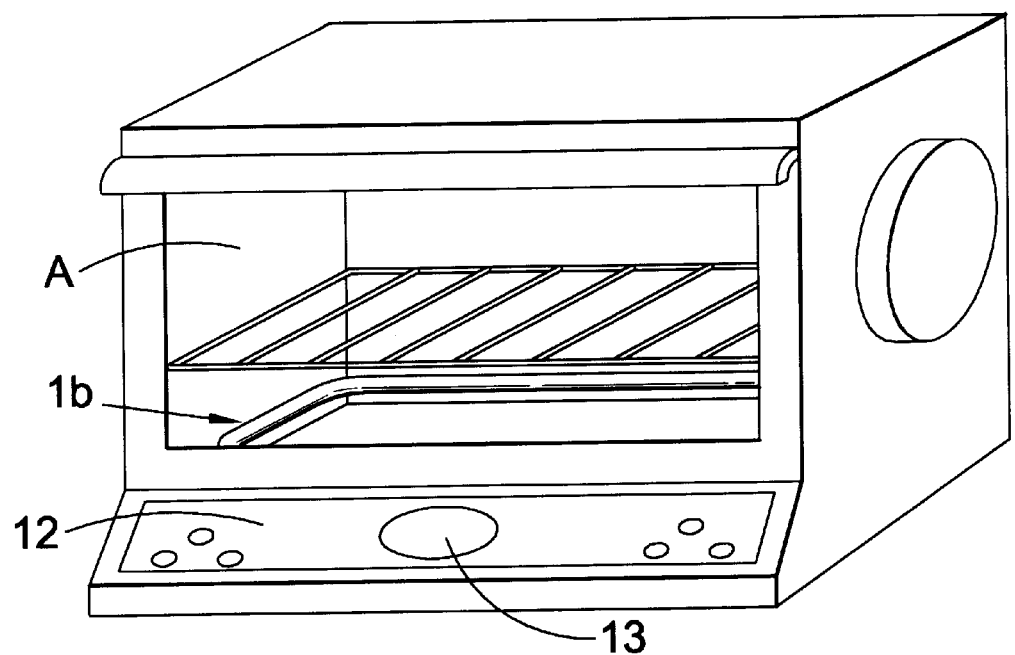
FIG. 1 is an isometric front view of the toast oven.
Figure 2:
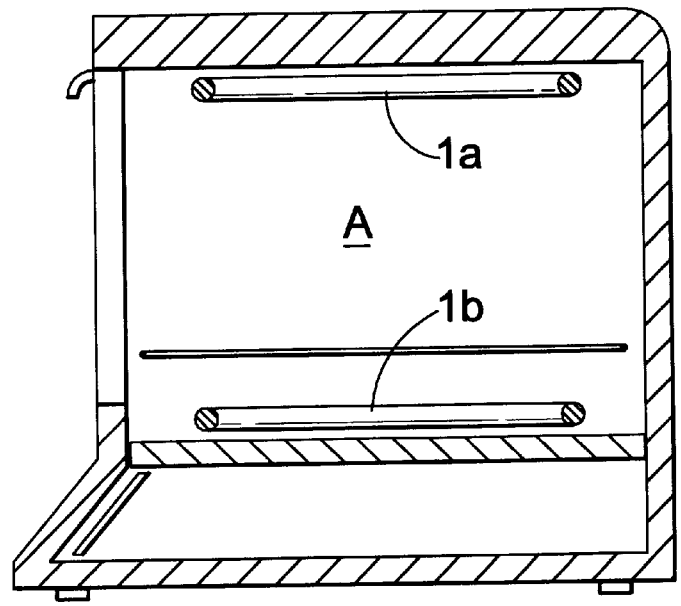
FIG. 2 is a sectional side view of the toast oven.
Figure 3:
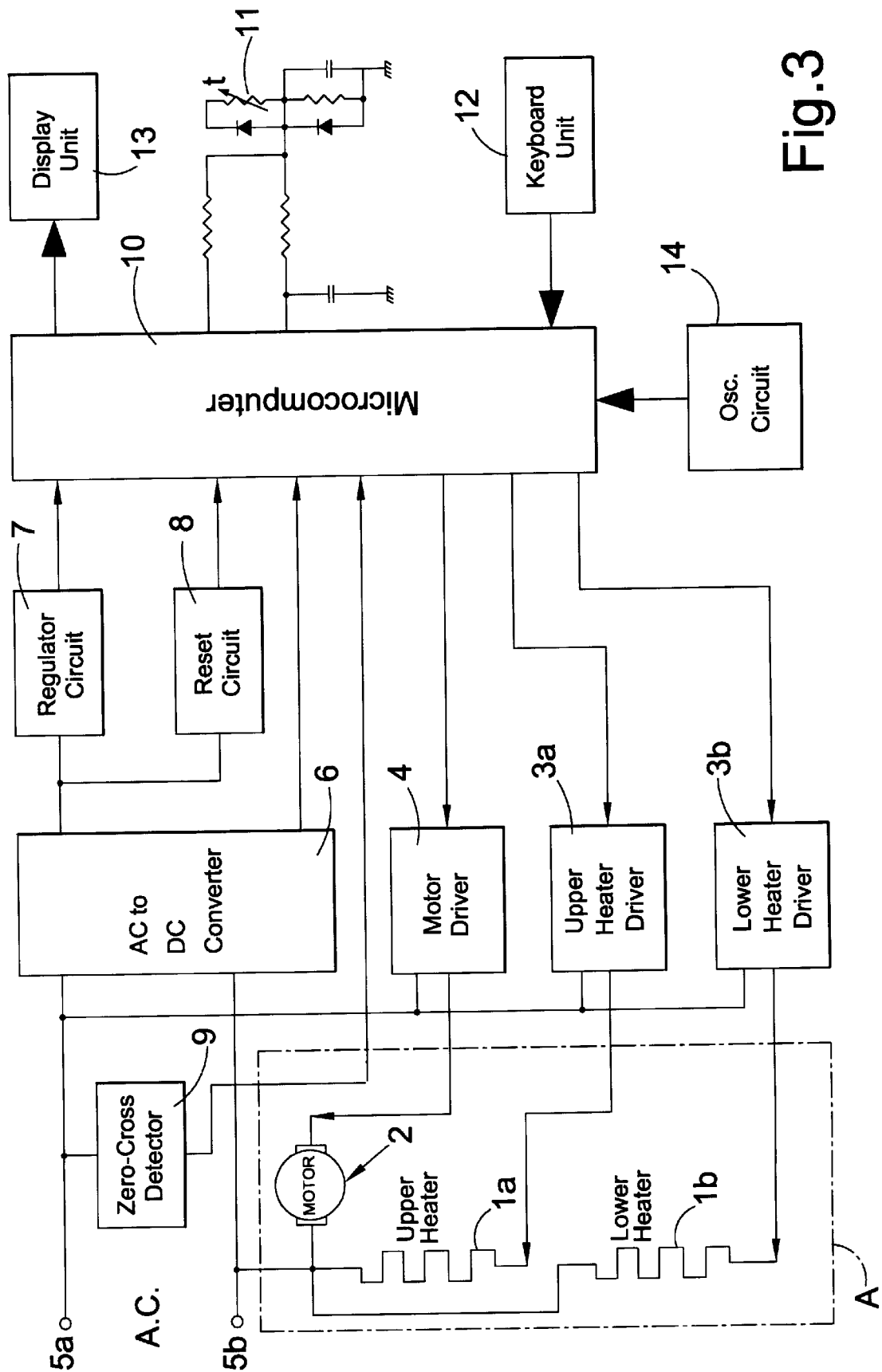
FIG. 3 is a block diagram showing the components of the toast oven.

Referring the drawings, in FIGS. 1 to 3 an oven chamber A contains two electric radiant heating elements 1a and 1b mounted inside. The two heating elements are connected to a source of electrical power through two individual heater drivers 3a and 3b. The heater drivers 3a and 3b are separately controlled by a microcomputer 10. The heating elements can therefore be independently operated for better controlling the temperature within the oven chamber and maintaining the interior of the oven chamber at a predetermined temperature. For toasting however, the heating elements are normally used simultaneously and not separately controlled. A fan motor 2 drives a fan (not shown) for circulating air within the chamber A when required.

Two terminals 5a and 5b are provided for connection to a mains AC power supply. The AC power supply voltage is stepped down and converted to a suitable (say 12 volts) direct current for the heater drivers 3a, 3b and the fan motor driver 4 using a converter 6. The DC voltage is regulated by a regulator circuit 7. The microcomputer 10 is reset by a zero to one pulse which is generated by a reset circuit 8 at an initial power ON stage, or if the supply voltage suddenly drops due to some failure or interruption. A zero-crossover detector 9 picks up an AC signal and detects the zero voltage signal for synchronization purposes.

The microcomputer 10 is programmed to fully control the operation of the oven toaster. Most of the operations rely on different temperature level signals provided by a thermistor element 11 (an NTC resistor). These levels are determined in accordance with the effective resistance of the thermistor element 11 at a particular time. The microcomputer 10 also responds to user input signals applied through a keyboard unit 12. A display unit 13 provides displays of settings and conditions of the toaster, including user toasting choices (that is settings relating to toast preference e.g. "light brown", "dark brown", etc.) and a count-down time display. An oscillator circuit 14 provides system clock signals to the microcomputer 10. The two heaters 1a and 1b, the thermistor network 11, and the microcomputer 10 form a closed loop system to control the toast oven operation in use.

Figure 4:
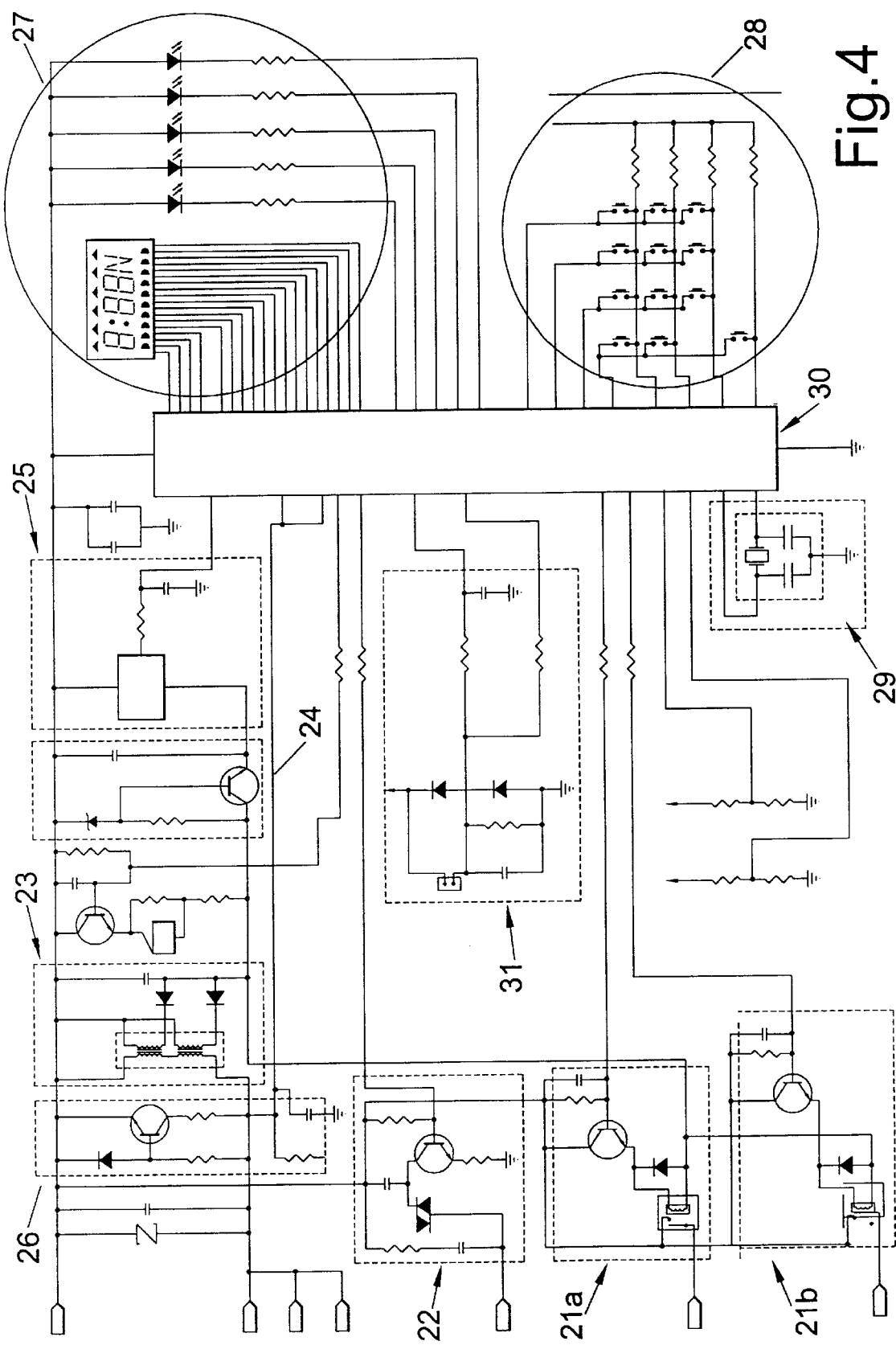
FIG. 4 is an electrical circuit for the toast oven.

In FIG. 4, the components of FIG. 3 are shown as follows:

Heater drivers 21a and 21b

Motor driver 22

AC to DC converter 23

Regulator circuit 24

Reset circuit 25

Zero-crossover detector 26

Microcomputer 30

Thermistor network 31

Display unit 27

Keyboard unit 28

Oscillator circuit 29

Figure 5:
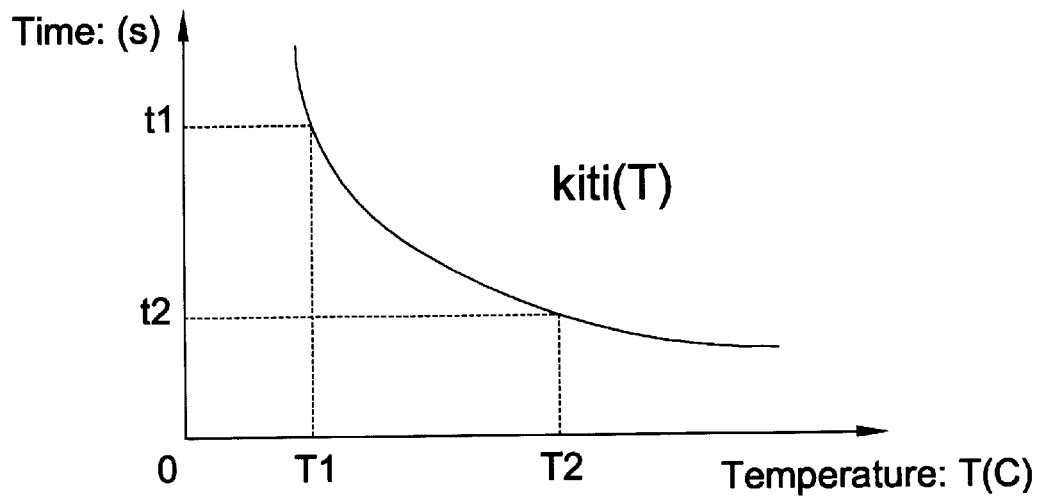
FIG. 5 is the toasting time to toast oven temperature relationship graph.

In FIG. 5, it is noted that oven temperature is inversely variable with cooking time for a given toast darkness value. Thus the higher the temperature the shorter the toasting time required to produce the same darkness. By using this principle, a special intelligent algorithm has been derived and is used for programming the microcomputer to adapt the toasting time according to the oven starting temperature and any changing environmental temperature. As a result, the microcomputer controls the toasting time automatically to produce consistent toasting results. The user simply selects and sets the desired toast darkness value on the keyboard unit 12 for each slice of toast and then presses a START button.

In a conventional toast oven, in order to make a toast with desired darkness, the user must estimate the required time and set the timer. However, the user does not know the initial oven temperature at the time of starting the toasting. The toasting result cannot therefore be consistent due to different initial oven temperatures. In embodiments of the invention, an "auto-compensation" means overcomes this problem.

Auto-compensation is a process of time adjustment for optimisation of oven temperature and cooking times. In FIG.

5, the oven temperature and toasting time for a given darkness is represented by a curve kiti(T), where the toasted bread will have the same darkness along the curve. There would in fact be a total of seven such curves each representing a user choice of toast. They comprise darkness level i=1,2,3,4,5,6,7, where for least darkness i=1 and for most darkness i=7. As oven temperature is inversely proportional to cooking time for a given toast darkness value, then for instance, a darkness setting 4 (medium darkness, i=4) is at a lower temperature T1, the required toasting time is t1.

If the initial temperature had been increased to T2 due to a previous toasting cycle, the required toasting time is decreased to t2. That means that the higher the initial oven temperature, a shorter the cooking time is required to produce toasted bread having the same darkness.

For a given temperature, curve kiti(T) is a function of temperature $$t = kiti(T)$$

where k is a constant, t is toasting time and T is oven temperature; i is darkness level.

By using this principle, a microprocessor program has been developed to adapt any oven temperature changes due to previous cooking or environmental changes. By using this configuration, consistent toast darkness is ensured no matter to what extent the oven temperature has changed between toasting cycles. The user needs only to select a required toast darkness and press "start" button on the keyboard unit 12 to obtain any desired toast consistently.

Figure 6:
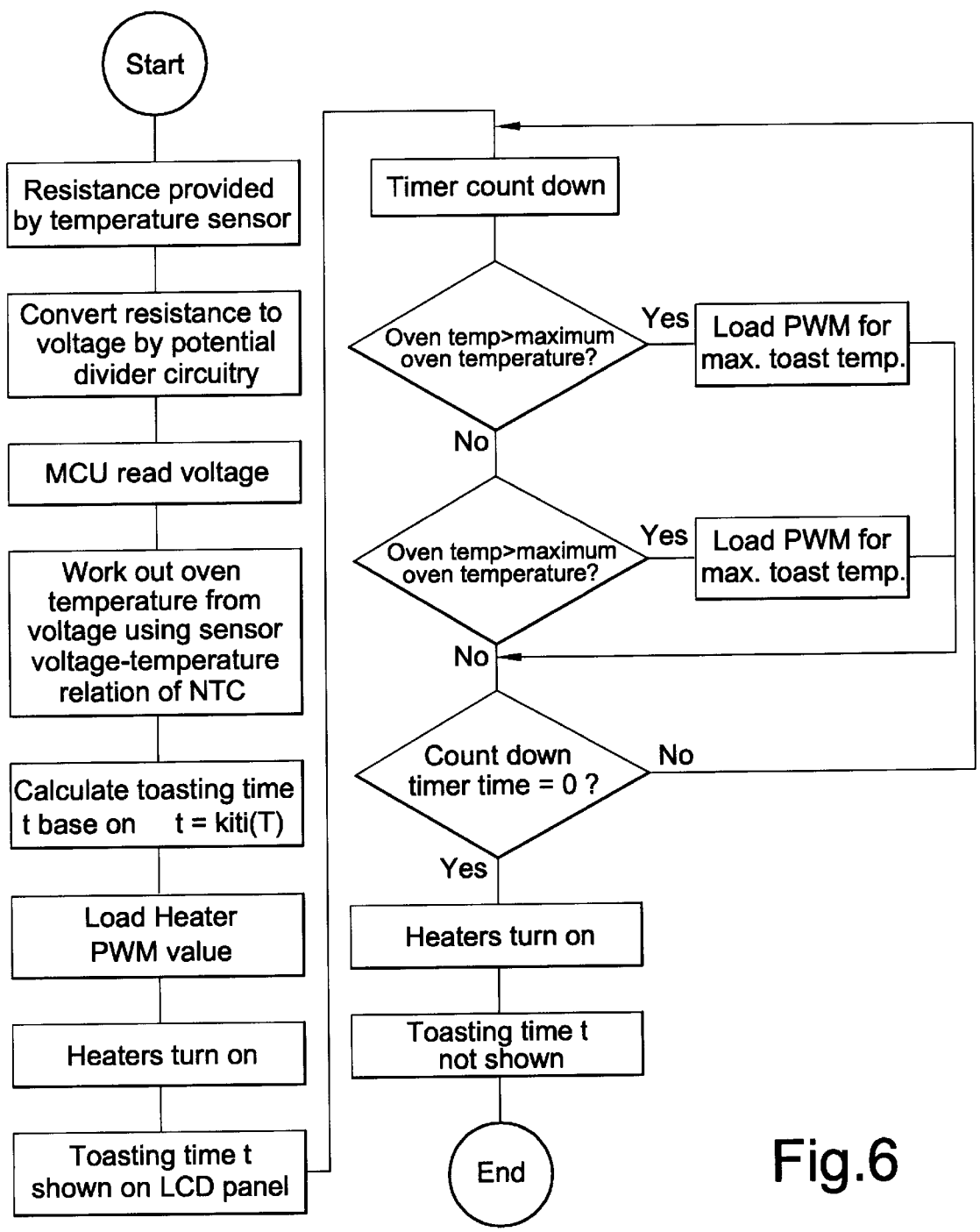
FIG. 6 is a logic flow chart of a program of the microcomputer for providing automatic control in a toasting cycle.

The flow chart for determining the required toasting time is shown in FIG. 6.

Referring to FIG. 6, the temperature sensor (the thermistor 11) is used to provide an initial oven temperature, the oven temperature is derived according to the effective resistance of the thermistor. The thermistor resistance is converted to a corresponding voltage by the thermistor network 31 so that the microcomputer can "read" the oven temperature.

In accordance with the temperature, the microprocessor calculates (or works out) the toasting time, using the auto-compensation equation t=kiti(T) as explained above.

In a next step, the microprocessor loads a preset heater pulse width modulation (PWM) value for toasting to control the heaters effectively in such way that both heaters are fully powered to supply maximum heat energy. There also provided a preset toasting upper temperature limit. If the oven temperature rises go to the upper temperature limit, another PWM value is loaded to control heaters to prevent over toasting. This greatly speeds up the cooking time while ensuring a desired toast darkness.

At the beginning of each toasting cycle toasting time is calculated by the microcomputer and displayed on the panel 13, and a count-down is started. Thus, during each toasting cycle, a user can read the remaining time of toasting directly from the panel 13. In practice, this useful information allows the user to observe and prepare, if necessary, for the end of each toasting cycle.

This time display (normally digital) showing counter timer is an important practical feature. When each toasting cycle is started, the display panel changes to count down timer mode at once and count down from the calculated toasting time begins immediately. The user can observe the remaining time for that toasting cycle at any time during toasting. When count down counts reaches zero, the heaters are turn off.

The variable PWM heater power control provides a much more accurate and more stable oven temperature than conventional ON/OFF heater controlled. This is because air itself has a large heat capacity so there is normally an inherent time delay between temperature sensing and heater response if the heater is simply turned ON and OFF. Conventionally, when the heaters as controlled simply to react to the oven temperature changes in this way, the actual oven temperature continues to change due to large heat capacity of air, and significant oven temperature fluctuations result. On the other hand, heaters driven by the PWM (PWM value is according to the oven temperature rising and decreasing ratio). The time delay factors had been minimized. Therefore, a more accurate and stable oven temperature is achieved. This kind of temperature control method applies to toasting, and also to other forms of cooking in the described toast oven.

Figure 7:
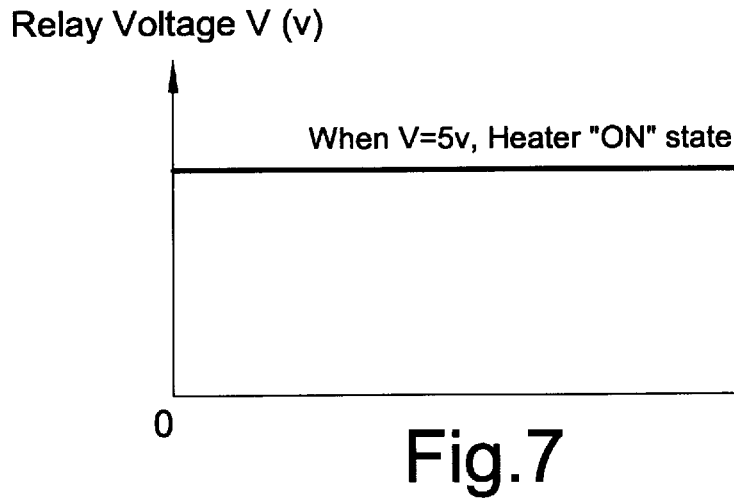
FIGS. 7 to 9 show the graphs of different form of pulse width modulation (PWM) heater control.
Figure 8:
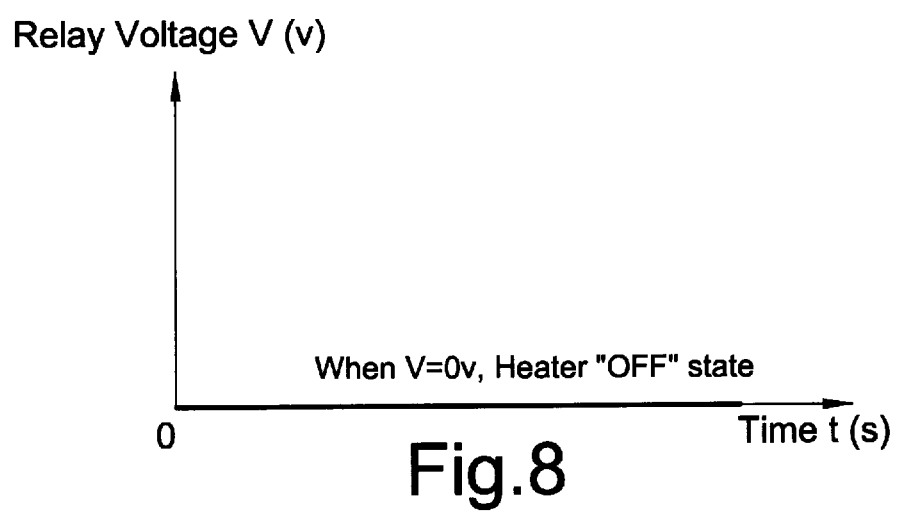
Figure 9:
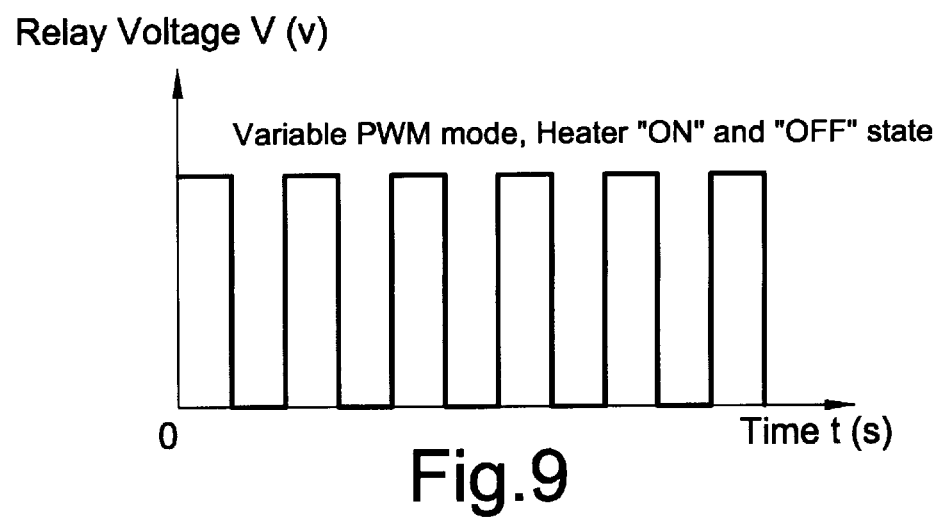

FIGS. 7 to 9 illustrate the different forms of PWM heater supply. Thus, in the case of supplying maximum power to the heaters, a DC or 100% duty-cycle pulse train is applied to the heaters as shown in FIG. 7, so that electrical energy is transmitted to heaters continuously. On the other hand when zero power is needed, a zero DC or 0% duty-cycle pulse train is applied to the heaters as shown in FIG. 8 so that no electrical energy is transmitted to the heaters. When intermediate electrical power is needed to supply the heaters, a PWM pulse train in between 0–100% duty-cycle is applied to the heaters as shown in FIG. 9.

Figure 10:
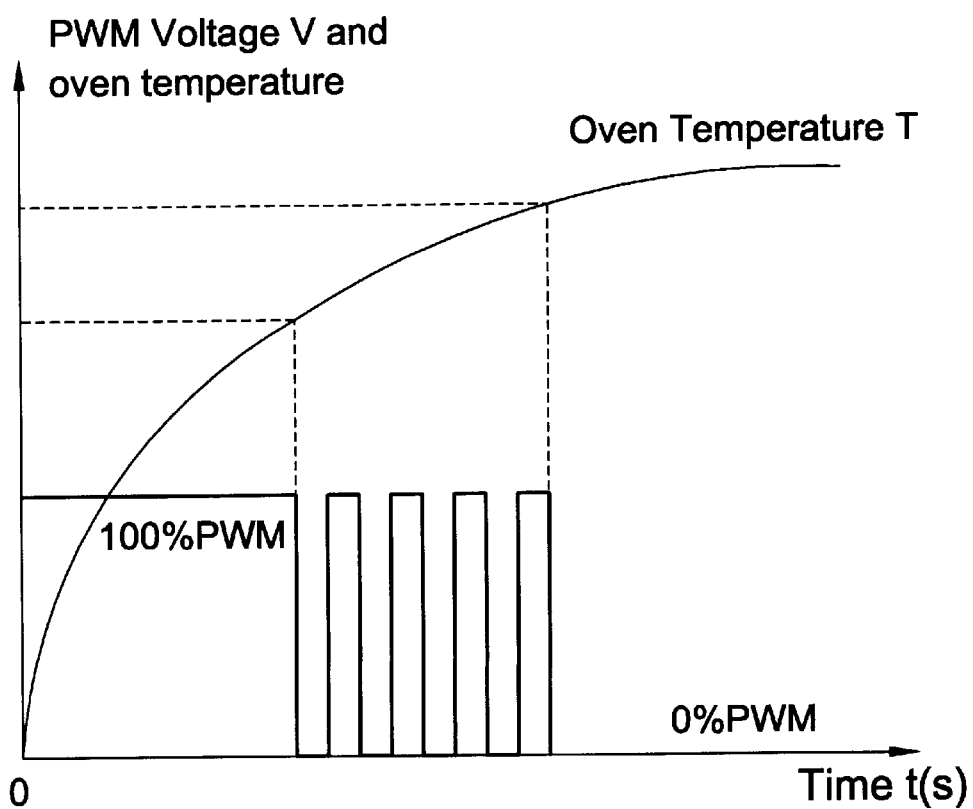
FIG. 10 is a cross reference graph of the oven temperature to a duty cycle of the PWM heater control.

FIG. 10 shows an oven temperature T and PWM duty-cycle relationship. A number of PWM duty-cycles pulse trains are set in microprocessor software. The microprocessor automatically determines which PWM duty-cycle applies to the heaters in order to minimize the temperature tolerance based on the oven temperature rising and decreasing ratio.

Figure 11:
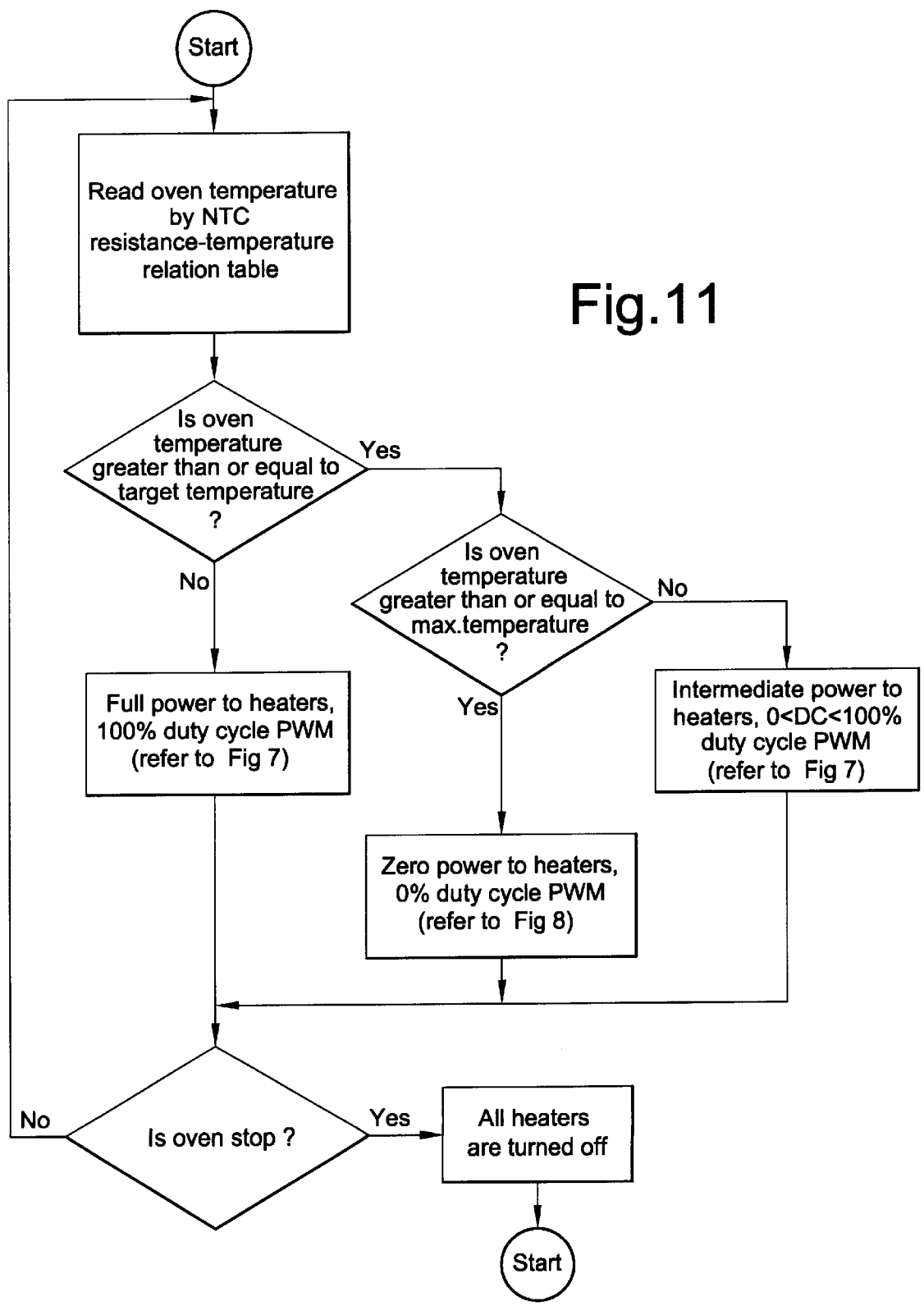
FIG. 11 is a logic flow chart of the PWM heater control.

FIG. 11 shows the flow chart of variable PWM accurately controlling power to the heaters.

We claim:

1. A toaster oven comprising; a radiant electrical heater mounted in an oven chamber, a thermistor arranged to produce electrical signals corresponding to an initially sensed temperature in said chamber, a microcomputer programmed to selectively determine each toasting time for food stuff in said chamber in accordance with a user selected toasting requirement and in accordance with said initially sensed oven temperature derived from said electrical signals.

2. A toast oven according to claim 1, including a toasting time display means that is controlled by said microcomputer to indicate and provide the remaining toasting time during each toasting cycle.

3. A toast oven according to claim 1, in which the heaters are arranged to be supplied in use with a pulse width modulated direct current power supply under the control of said microcomputer.

4. A toaster oven having a radiant electrical heater mounted in an oven chamber, a thermistor arranged to produce electrical signals corresponding to an initially sensed temperature in the chamber, a microcomputer programmed to selectively determine each toasting time for food stuff in the chamber in accordance with a user selected toasting requirement and in accordance with the initially sensed oven temperature derived from said electrical signals, and a toasting time display means that is controlled by said microcomputer to indicate the remaining toasting time during each toasting cycle.

* * * * *